Dec. 1, 1925.  
R. L. SEABURY  
BEARING  
Filed Dec. 3, 1920  
1,563,663
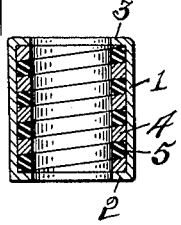
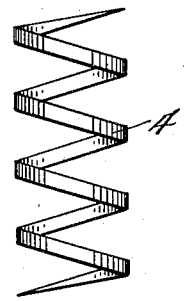
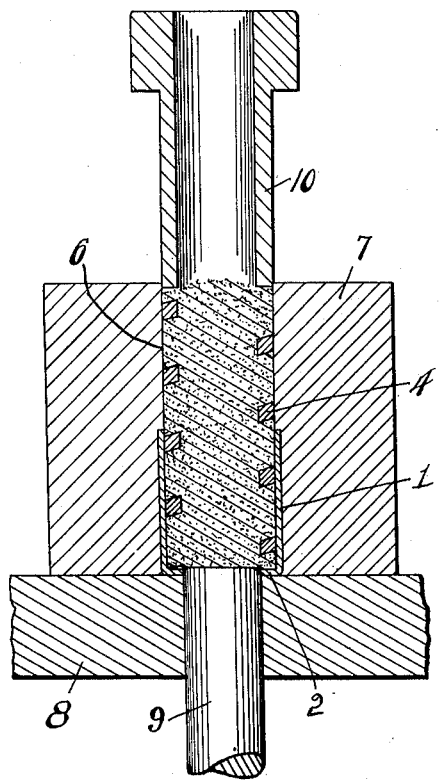
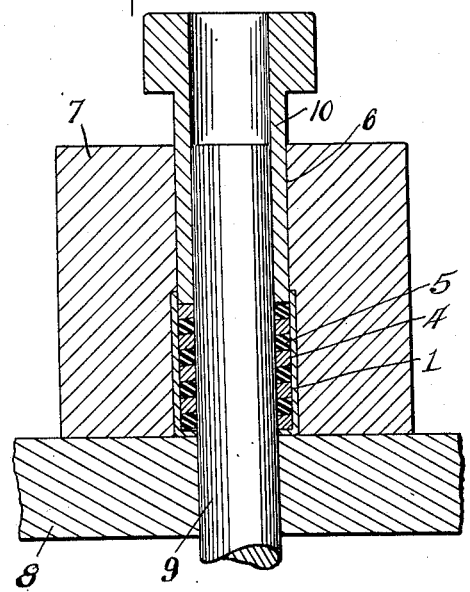
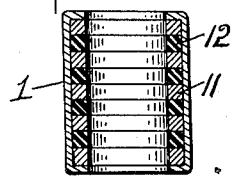
INVENTOR  
Ralph L. Seabury,  
By Owen Owen & Crampton,  
His attys.

Patented Dec. 1, 1925.

1,563,663

UNITED STATES PATENT OFFICE.

RALPH L. SEABURY, OF TOLEDO, OHIO.

BEARING.

Application filed December 3, 1920. Serial No. 428,082.

*To all whom it may concern:*

Be it known that I, RALPH L. SEABURY, a citizen of the United States, and a resident of Toledo, in the county of Lucas and State of Ohio, have made an Invention Appertaining to Bearings; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to bearings and to a method of making same, and more especially to that type of bearings employing graphite or other lubricating agent in combination with metal.

Heretofore various combinations of metal and graphite have been used or proposed to secure a self-lubricating bearing surface for shafts and other rotating parts but have not proven satisfactory. Among such combinations are powdered or shredded brass mixed with graphite and subsequently pressed into the desired shape, and the filling of recesses in bearing surfaces with graphite or a mixture of graphite and sulphur or graphite and heavy grease, or other lubricating compounds.

Bearings of the first mentioned class, namely, those composed of powdered or shredded brass compressed with graphite are objectionable for the reason that they lack sufficient mechanical strength to withstand appreciable loads or shocks from the shaft. Bearings having recesses or "riflings" which have been subsequently filled in with compact graphite or graphitic mixtures possess great strength, but in use soon lose their self-lubricating qualities, as the graphite quickly wears away at the surface of the bearings contact, or, as sometimes happens when an excess of oil is added to such a bearing, the graphite becomes loosened from its recess and is washed or flooded out at the ends of the bearings.

Numerous other combinations have been attempted or advocated for producing a self-lubricating bearing, but none, so far as I am aware, has given a product of sufficient mechanical strength together with a permanent or long lasting lubricating quality.

The primary object of my invention is the provision of a bearing of good mechanical strength combined with an effective and permanent self-lubricating feature.

The invention is fully described in the following specification, and illustrated in the accompanying drawings, in which,—

Figure 1 is a central longitudinal section of a bearing embodying the invention. Fig. 2 is a side elevation of the spiral metal of the bearing in initial expanded position. Fig. 3 is a sectional view of the bearing forming dies, with a bearing therein preparatory to having the surplus graphite forced therefrom and the bearing compressed. Fig. 4 is a similar view thereof with the means forming the bearing surface compressed in finished position, and Figs. 5 and 6 are central longitudinal sectional views of slightly modified forms of the bearing.

In carrying out my invention I employ a metal shell 1, preferably of steel with thin walls and having a turned in annular flange 2 at one end. The length of the shell is slightly greater than the finished bearing to permit the turning in of a flange 3 at the end thereof opposed to the flange 2 so that the means forming the bearing surface and confined within the shell may be firmly held between the two end flanges thereof.

In the form of bearing shown in Fig. 1, the means forming the bearing surface comprises a helix 4 of bronze or other suitable bearing metal and a similar helix 5 of graphite or other suitable self-lubricating material filled into the helical space between the convolutions of the metal helix 4. The helix 4 is preferably made of squared drawn wire having an outside diameter to adapt it to fit closely within the shell 1 and an inside diameter a few thousandths of an inch larger than the diameter of the shaft which the bearing is to receive. It is found in practice that a wire $\frac{1}{8}$ inch square for the helix 4 gives very good results although larger dimensions might be better for larger bearings. The metal helix is wound open so that the space between the adjacent coils thereof is about three times the cross-section of the metal. This ratio is chosen because powdered graphite when compressed between the coils of the metal helix to the desired hardness to form the compressed bearing, as hereinafter described, compresses to about one-third of its original bulk, the pressure applied being about 20 tons per square inch.

In forming a bearing, a shell 1 is placed entirely within the opening 6 of a mold 7, which opening corresponds in cross-section to the shell and has a portion without the open end of the shell in endwise abutment therewith and with its diameter corresponding to the inner diameter of the shell. The mold may rest on a bed or other support 8. The helix 4 is next placed in the mold opening and shell with its inner end in engagement with the bottom flange 2 of the shell and with its outer end terminating adjacent to the upper or opposite end of the mold opening, the opening being of sufficient length for such purpose. The bottom of the mold opening 6 is then closed by a plug plunger 9, with the closing end of the plunger disposed in substantially flush relation to the shell flange 2, and the space above the plunger within the shell and helix is then filled with a powdered graphite, as shown in Fig. 3. The plunger is then raised until its top is even with the top of the mold 7 so that all of the graphite, except that which has been forced outward to fill the space between the coils of the helix, is forced above the mold in position to be scraped off or otherwise disposed of. A cylindrical plunger 10, having its inner and outer diameters corresponding to those of the helix 4, is then inserted into the opening 6 over the outer end of the helix, and, upon the application of a pressure of approximately twenty tons per square inch is caused to press the helix down into the shell 1 and effect a compression of the graphite between the coils of the helix an extent equal to substantially two-thirds of the original bulk of graphite between the coils. It is evident that this action reduces the space between the coils of the helix to about one-third its original size so that the helical layers of graphite in thickness are substantially equal to the helical layers of metal dividing the same, as shown in Fig. 4. The closing of the helix 4 takes up but a very minute amount of the pressure applied so that practically speaking, the total pressure applied is transmitted equally from coil to coil of the metal helix in the compression of the graphite throughout the entire length of the bearing. This enormous pressure makes the graphite very solid and firm and there is practically no tendency of either the metal helix or graphite helix to open after the release of the pressure. After the compressing operation, the shell and enclosed helixes of the metal and graphite are removed and the projecting end of the open end of the shell turned over upon the end of the helix to retain the parts of the completed bearing assembled. It is preferable, however, to permit the plug plunger 9 to remain within the bearing until the overturning of the end flange 3 has been accomplished.

It is evident that when a bearing is used for rotating parts, the alternate layers of metal and graphite, or other lubricating material, should be either of helical form or placed other than at a right angle to the bearing axis so that no bearing point of the shaft would have continual engagement with the metal parts of the bearing. If the bearing is to be used for reciprocating parts, the coils of the metal and graphite helixes may be substituted by successive rings of metal and graphite, as shown in the completed bearing in Fig. 5. This bearing may be made by the same method as that above described, except that between each two pair of metal rings, is placed a ring of graphite having an original bulk preferably substantially three times that of a metal ring so that upon the application of the requisite pressure, the graphite rings are compressed to about one-third of their original bulk.

If instead of using graphite as a lubricating agent, some other suitable material, such as talc, wood-pulp, lampblack, or the like used, the same procedure as above described in making a bearing would be followed.

If, however, it is desired to use cotton wicking, felt or other fibrous material of a continuous nature in place of the graphite, it would be practical to first place the metallic helix or ring members on the plug plunger 9 and then wind in between the coils or rings the wicking or other continuous material chosen, after which the whole is inserted into the mold 7 and shell 1 and the requisite pressure applied to highly compact the fibrous material between the rings or coils of the helix to form a solid and firm mass. A bearing made in this way could be improved by then boiling it in some good lubricating oil, as the compact fibrous material would absorb a material quantity of the oil and render the bearing self-lubricating for a long period of use.

It is evident that if the bearing is to be used as a journal, the enclosing shell or holding means may be transferred from the outside to the inside of the assembled bearing parts, as shown in Fig. 6.

An important feature of my bearing is the fact that the bearing material can be introduced in the shape of a very firm and hard drawn wire which has superior strength and better texture and grain for bearing purposes than the same metal when made by casting.

Another important feature of my invention is the fact that compressed graphite has a grain at right angles to the direction of compression and that compressed graphite gives far superior qualities as a bearing when the movement of the bearing is crosswise instead of lengthwise of the grain, which latter is the case in rifled or recessed bearings having the rifles or recesses thereof filled with radially pressed in graphite or graphitic material.

It is also evident with my invention that a very good bearing can be produced by using two or more metallic helixes of different material, the coils of one helix being disposed between the coils of the other, and the whole firmly compressed together with or without the addition of graphite. In any one of these forms the metallic case or holder would serve to firmly hold the various parts or materials forming the bearing surface together in a permanent and secure manner.

I wish it understood that while I have described a number of forms of my invention and illustrated some of such forms, and have illustrated one method of producing a bearing embodying my invention, the invention is not restricted to the forms and method illustrated and described but may be materially varied and modified without departing from the spirit of the claims.

Having thus described my invention, what I claim as new, and desire to secure by Letters Patent, is,—

1. A bearing comprising a shell, and a plurality of helixes of different materials having their coils alternating and held in assembled relation by said shell, one of said helixes being of metal and the other of relatively soft material and said helixes being under relatively great initial compression whereby the several coils are closely compacted.

2. A bearing comprising a shell, and a plurality of highly compressed helixes having their coils alternating and held in assembled relation in said shell, one of said helixes being of relatively soft pliable material and the other helix being of antifriction metal.

3. A bearing comprising a shell, a plurality of highly compressed helixes having their coils alternating in said shell, one of said helixes being of graphite and the other helix being of bronze, and means on the shell for holding the helixes in their initially compressed form.

4. A bearing surface comprising a drawn wire helix having a graphitic material closely fitting between the open coils thereof and compressed to less than one-half its original bulk.

In testimony whereof, I have hereunto signed my name to this specification.

RALPH L. SEABURY.